United States Patent [19]
Oshima

[11] 3,906,530
[45] Sept. 16, 1975

[54] SIMPLIFIED CAMERA
[75] Inventor: Shigeru Oshima, Tokyo, Japan
[73] Assignee: Fuji Photo Film Co., Ltd., Minami-ashigara, Japan
[22] Filed: July 15, 1974
[21] Appl. No.: 488,854

[30] Foreign Application Priority Data
July 24, 1973 Japan.............................. 48-83802

[52] U.S. Cl. ................. 354/206; 354/213; 354/204
[51] Int. Cl.²........................................... G03B 17/42
[58] Field of Search ............ 354/204, 206, 212, 213

[56] References Cited
UNITED STATES PATENTS
2,395,828  3/1946  Kallusch .............................. 354/204
3,603,235  9/1971  Nelson ................................. 354/213

*Primary Examiner*—Robert P. Greiner
*Attorney, Agent, or Firm*—Sughrue, Rothwell, Mion, Zinn & Macpeak

[57] ABSTRACT

A simplified camera wherein an arrangement for locking the film wind-up means, insures that only one frame of the film is advanced and exposed at a time, an arrangement holds a shutter actuator in a cocked position until a photographer is ready to take a shot, and an arrangement for linking and effecting simultaneous disengagement of these locks when a photograph is taken, allows film advance and cocking of the shutter actuator simultaneously.

1 Claim, 2 Drawing Figures

FIG. 1
FIG. 2
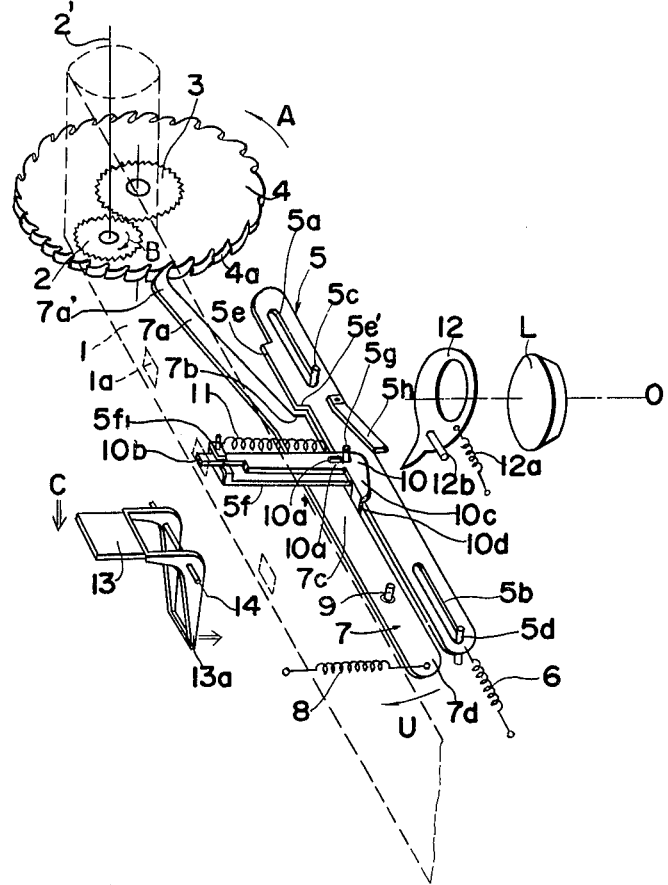
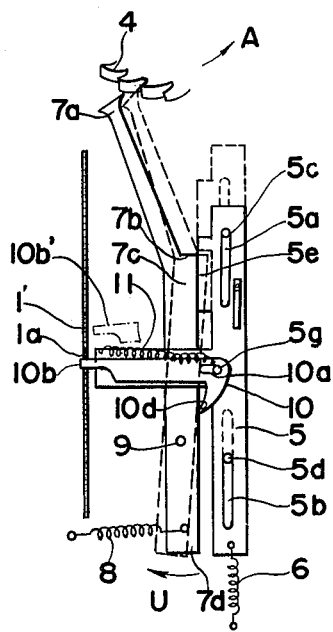

SIMPLIFIED CAMERA

BACKGROUND OF THE INVENTION

1. Field of the Invention

The present invention relates to a simplified camera having an improved compact construction, wherein loaded film is advanced by actuation of a wind-up gear.

2. Description of the Prior Art

There are known various types of simplified cameras, which have the main objects of making is possible to obtain photographs in a simple manner, and with low-cost equipment. If classfied according to the manner of loading film, these cameras may be divided into two broad types, one of which being loaded film within a pack or cassette into a camera while the other of which is loaded film directly into a camera, by a manufacturer, or at an establishment for development of film.

Conventionally, in such simplified cameras wherein film advance and cocking of a shutter actuation means are effected simulataneously there must be provided a means for locking the film wind-up means, to ensure that only one frame is advanced and exposed at a time, a means for holding the shutter actuation means in a cocked position until a photographer is ready to take a shot, and means for linking and effecting simultaneous disengagement of these lock means when a photograph is taken. In other words, there is a restriction placed on the degree to which construction may be simplified, and cost accordingly lowered.

In order to reduce the number of elements required in a conventional simplified camera, it has been known to hold a shutter actuation means in a cocked position by a lock means, which is connected to the actuation means and also engages a perforation in a film, which may be moved in a forward direction only, and, in order to take a photograph, to forcibly disengage the lock means from the film perforation, whereupon the shutter actuation means is moved by a restoration spring, or similar means to actuate the camera shutter. However, a disadvantage in such a camera is that, since a film is subjected to a force which must be sufficient to retain a shutter actuation means in a cocked position counter to the force of a restoration spring, or similar means, and which is suddenly released when a photograph is taken, a film may be moved slightly out of correct alignment when exposed, thus resulting in even quality of photographs produced, such as blur and the like, It is accordingly an object of the present invention to provide a simplified camera wherein necessary constructional elements are made minimum, and cost is thereby lowered.

It is another object of the invention to provide a simplified camera wherein constructional elements are minimum, but a film may be held in a stationary, correct alignment when exposed.

SUMMARY OF THE INVENTION

In accomplishing these and other objects, there is provided, according to the present inventiom, a simplified camera wherein film is advanced by rotation of a manually actuated ratchet, which drives a film wind-up reel, and for each advance of one film frame, a shutter actuation plate is moved to a cocked position by a lever, which is mounted thereon, and which may slide and pivot slightly with respect thereto, and which engages successive perforations in the film, engagement of the lever with a perforation causing the lever to be advanced together with the film. The camera also comprises a pivotal lock lever, one end of which forms a detent end for engagement of the drive ratchet, and the main portion of which normally, i.e., when the shutter actuation plate is in an uncocked position, is generally parallel to and contacts a salient portion of the shutter actuation plate, in which configuration, the lock lever does not engage the drive ratchet. When the shutter actuation plate is moved to a cocked position, the salient portion thereof is moved out of contact with the lock lever main portion, which is thereupon swung towards the shutter actuation plate, and into a position in which the shutter actuation plate is engaged by suitably formed portions of the lock lever and held in a cocked position thereby, and the lock lever detent end is moved into engagement with, and locks the drive ratchet. At the same time, the lock lever contacts the film engagement lever, and swivels it out of engagement with the film perforation with which the engagement lever has been hitherto engaged, and so moved together with the film. Depression of a camera shutter button to take a photograph causes the lock lever to pivot, and the main portion thereof to move away from, and disengage the shutter actuation plate, which is thereupon returned to an uncocked position by a spring, or similar, means, and simultaneously actuates the camera shutter. When the shutter actuation plate has been returned to an uncocked position, the film engagement lever is moved into engagement with the perforation of the next film frame, the abovedescribed action being repeated for successive shots.

BRIEF DESCRIPTION OF THE DRAWINGS

These and other objects and features of the present invention will become apparent from the following description taken in conjunction with one preferred embodiment thereof with reference to the accompanying drawings, in which;

FIG. 1 is a perspective partial view of disassembly main pairs to be provided internally in a simplified camera according to the present invention, and FIG. 2 is a schematic plane view showing some parts of FIG. 1, for the purpose of illustrating action of the parts.

DESCRIPTION OF THE PREFERRED EMBODIMENT

Before the description of the present invention proceeds, it is to be noted that like parts are designated by like reference numerals throughout the accompanying drawings. Also, it is to be noted that terms such as front or rear, leftwards, or rightwards, are to be taken to mean as seen by a person aiming a camera at an object to be photographed.

Referring to FIG. 1, film 1, which, together with elements described below, is contained in a camera housing of conventional type not shown, is advanced from a loading chamber of the housing in a line normal to the optical axis O of an ojbect lens L, and wound onto a reel 2', which is provided on a wind-up chamber of the housing and is indicated schematically by a single vertical line in the drawing, and is in fixed and coaxial connection with a wind-up gear 2, as construed with a known construction. The wind-up gear 2 is engaged with and may be driven by a small diameter gear 3, which is in fixed and coaxial connection to a large diameter ratchet 4 which is rotatably provided in the housing. The ratchet 4 is partially apparent at the exterior of the camera, and may be rotated manually in the direction A, thus causing the wind-up gear 2 to be rotated in the opposite direction B, and the film 1 to be wound onto the reel 2', and advanced. The film 1 comprises a perforation 1a for each frame thereof, and each perforation 1a in turn is engaged by an engagement lever 10, which is mounted on a shutter actuation plate 5, Each time the film 1 is advanced one frame, the engagement lever 10 and the shutter actuation plate 5 are moved from an uncocked position to a cocked position in a known manner.

Still in FIG. 1, the shutter actuation plate 5 is a comparatively long, a thin plate, which is disposed horizontally and in a left to right alignment. The plate 5 may be moved reciprocally along a line parallel to film 1 advance, and is guided in this motion by vertical, fixed pins 5c and 5d, which, respectively, are fixed on the housing and extend through long slots 5a and 5b, which are formed in the plate 5 in line with the longitudinal axis thereof, and near opposite ends thereof. On the upper surface of the shutter actuation plate 5 there is provided an actuation arm 5h, which is slightly flexible, is fixedly attached at one end to the plate 5, and extends upwards and rightwards therefrom. During movement of the shutter actuation plate 5 from a rightmost uncocked position to a leftmost cocked position, the top side of the arm 5h comes into contact with the actuation end of a shutter 12, is bent down slightly thereby, and is allowed to pass without actuating the shutter 12. The shutter 12 is, for example, a pivotally mounted single leaf shutter, which is provided on the housing through a pin 12b and is spring-loaded by a spring 12a provided between the housing and shutter 12 to be normally in line with the optical axis of the lens 3. During movement of the actuation plate 5 from a cocked to an uncocked position, the unattached end of the arm 5h is brought into contact with the actuation end of the shutter 12, and pivots the shutter 12 against the force of the spring 12a, and out of line with the axis of the lens L, whereby a film frame is exposed. By the time the plate 5 has moved to a rightmost, uncoked position, the arm 5h has been moved past the location of the shutter 12, and the spring 12a is unopposed to move the shuuter 12 back to its normal closed position.

At the rear edge of the shutter actuation plate 5, towards the left-hand end thereof, there is formed an integrally attached salient portion 5e, the right-hand end of which forms a sharply angled corner 5e', which is engageable by a lock lever 7, described below. Projecting rearwards at right-angles from a generally central portion of the plate 5 there is an integrally attached support arm 5f, which supports the above-mentioned film engagement lever 10, and whose rear end forms two separated, bracket-shaped portions which are bent upwards, and together constitute a gate 5fl, which is large enough to permit lateral and front to rear sliding movement of an end portion 10b of the film engagement lever 10.

The film engagement lever 10 comprises a horizontal main portion 10a, which lies flat on the support arm 5f, a short, horizontal portion 10c, which extends rightwards from the forward end of the main portion 10a, and a push portion 10d, which is formed at the end of the short horizontal portion 10c, extends downwards and curves rearwards slightly, and is contactable by the lock lever 7. Near the front end of the main portion 10a there is formed a slot 10a'. The slot 10a' receives a pin 5g, which is fixedly attached to the actuation plate support arm 5f. The dimensions of the slot 10a' relative to those of the pin 5g, are such as to permit the engagement lever 10 to pivot and slide slightly with respect to the support arm 5f. The above-mentioned end portion 10b of the film engagement lever 10 is constructed by a narrow, rearward extension of the lever main portion 10a. A small tension spring 11, which is attached at one end to the left-hand portion of the gate 5fl of the supportarm 5f, and at the other end to a forward, left-hand point of the engagement lever 10, acts to pull the lever 10 rearwards, and to pivot the lever 10 slightly anti-clockwise, as seen from above, and to hold the lever 10 in an alignment wherein the main portion 10a thereof is generally aligned with the support arm 5f., the narrow end portion 10b thereof extends through the gate 5fl and into engagement with a film perforation 1a, and the push portion 10d thereof is simultaneously pressed against the rear edge of the actuation plate 5. In this configuration, when the film 1 is advanced by being wound up on the reel 2, engagement of the lever end portion 10b with the perforation 1a causes the lever 10 and actuation plate 5 to be advanced leftwards together with the film 1. The film engagement lever 10 may, however, be moved out of this alignment by the action of the above-mentioned lock lever 7.

The lock lever 7 is a long lever provided horizontally, on a level with, and to the rear of the shutter actuation plate 5, and is pivotally mounted on a fixed pin 9, which is fixedly provided on the housing nearer the right-hand end 7d thereof. A tension spring 8, which is attached to one end to the lock lever right-hand end 7d, and at the other end to a camera rear wall portion of the housing, exerts a constant force to pull the lever end 7d rearwards, away from the shutter actuation plate 5, and cause the main portion 7c of the lever 7 to move towards and into contact with the actuation plate 5. The lock lever 7 may, however, be pivoted around the pin 9 in the opposite direction by the action of a shutter button 13, described below, which causes the lock lever right-hand end 7d to be pushed forwards, counter to the spring 8. Extending leftwards and slightly rearwards away from the lock lever main portion 7c there is a long, integrally attached arm 7a, which extends as far as the ratchet 4, and is terminated by a detent portion 7a', which may engage and lock the ratchet 4. At the forward side of the junction of the lock lever arm 7a and the main portion 7c, there is formed an engagement corner 7b, which may engage the above-mentioned corner 5e' formed on the salient portion 5e of the shuuter actuation plate 5. It is to be noted that the front edge of the lock lever main portion 7c contacts the push portion 10d of the film engagement lever 10, as noted earlier, but in the normal configuration of the lock lever 7 exerts no pressure thereon.

Referring to FIG. 2, due to the reaction of the spring 8, the lock lever main portion 7c is normally urged into contact with the shutter actuation plate 5, and the detent end 7a towards the ratchet 4. As indicated by the full line portion of the drawing, when the plate 5 is in a rightmost, uncocked position, the lock lever main portion 7c contacts the salient portion 5e of the actuation plate 5, the detent end 7a lies out of contact with the ratchet 4, and the lock lever main portion 7c does not exert pressure on the push portion 10d of the film engagement lever 10, the spring 11 thus being unopposed to bring the engagement lever 10 into an alignment wherein the end 10b thereof projects through the gate 5f1 to engage a film perforation 1a, and the push portion 10d thereof is pressed against the actuation plate 5. As shown by the dashed line portion of the drawing, when the shutter actuation plate 5 is moved to a leftmost, cocked position, the salient portion 5e thereof is slid out of contact with the lock lever main portion 7c, whereupon the lock lever 7 is allowed to be pivoted by the spring 8 into an alignment wherein the detent end 7a engages and locks the ratchet 4, and the engagement corner 7b moves into a position to block the corner 5e' of the shutter actuation plate 5, and retain the plate 5 in a cocked position. At the same time, the forward edge of the lock lever main portion 7c pressed the film engagement lever push portion 10d, and causes the lever 10 to slide and pivot slightly on the pin 5g, and moves into an inclined alignment relative to the support arm 5f and out of engagement with the film perforation 1a, as indicated schematically by the chain-dot line portion of the drawing. In other words, the shutter actuation plate 5 is now held in a cocked position by the lock lever 7 only. The lock lever 7 is moved anticlockwise and out of engagement with the actuation plate 5 upon depression of the above-mentioned shutter button 13.

Referring back to FIG. 1, the shutter button 13, which projects above the top of the camera, is aligned horizontally, and is fixedly attached to one end of a right-angled lever frame 13b, which is pivotally mounted on a fixed horizontal shaft 14, which is fixedly provided on the housing, and whose other end connects through suitable known means not shown to the actuation end 7d of the lock lever 7. When the shutter button 13 is depressed, the lever frame 13b is pivoted on the shaft 14, the end 13a thereof being moved forwards and moving the lock lever actuation end 7d also forwards, and causing the lock lever 7 to pivot to a position wherein the engagement corner 7b thereof no longer engages the salient portion corner 5e' of the shutter actuation plate 5, which is therefore returned to an unclocked position by the spring 6.

Action in taking a photograph with the above-described means is resumed below in reference to FIGS. 1 and 2. At first, the shutter actuation plate 5 is in a rightmost position, the lock lever 7 is generally parallel thereto and contacts the salient portion 5e thereof, the lock lever detent portion 7a is out of engagement with the ratchet 4, and the film engagement lever 10 engages the perforation 1a of a film frame 1' which has not yet been exposed, or moved to a position for exposure, as shown with solid lines portion of FIG. 2. When now the ratchet 4 is rotated manually in the direction A, the reel 2 is rotated in the direction B, and the film 1 is advanced, the previously exposed frame being moved out of line with the optical axis of the lens L, and the frame 1' being moved into line therewith. When thus advanced, the film frame 1' pulls together with the lever 10 engaging the perforation 1a thereof left-wards, and, subsequently, the lever 10 pulls the shutter actuation plate 5 left-wards to a cocked position, whereupon the lock lever 7 moves to hold the shutter actuation plate 5 in the cocked position, to lock the ratchet 4, and to move the engagement lever 10 out of engagement with the perforation 1a of the film frame 1', as shown with dashed lines portion of FIG. 2. Upon manual depression of the shutter button 13, the lock lever 7 is pivoted out of engagement with the shutter actuation plate 5, which is moved back to an uncocked position by the spring 6, and during this movement pivots the shutter 12 to permit exposure of the film frame 1'. When pressure on the shutter button 13 is released, the spring 8 moves the lock lever back towards the shutter actuation plate 5, the plate 5, lever 7, and engagement lever 10 thus being returned to their original configuration, and the lever 10 engaging the perforation 1a of the next film frame to be exposed.

Needless to say, the camera of the present invention may be associated with spool-loaded or cartridge-loaded film, and actuation of a ratchet for film advance may be effected by a pawl lever, for example, rather than by direct manual rotation. Also, the shutter employed may be of various types, for example, a quillotine-type electronic shutter, in which case the actuation arm 5h on the plate 5 may effect switching of the shutter control circuit.

As is clear from the above description, the present invention provides a simplified camera which offers the advantage that main constructional elements are reduced to a minimum, and also that there are no elements which are liable to move a film upon shutter actuation and film may be maintained in correct alignment when exposed.

Although the present invention has been fully disclosed in conjunction with the preferred embodiment thereof with reference to the accompanying drawings, it is not to be limited thereby. Since various changes and modifications are apparent to those skilled in the art, such changes and modifications should be constructed as included within the scope of the present invention, unless otherwise departing therefrom.

What is claimed is:

1. In a simplified camera including a shutter and wherein loaded film is advanced by actuation of a wind-up gear, an improvement comprising: a small diameter gear engaging and driving said wind-up gear, a large diameter ratchet being in fixed and coaxial connection with said small diameter gear, and being manually rotatable, a shutter actuation means being reciprocally slidable along a line parallel to film advance, and which comprises a salient portion and an engagement projection protion, means exerting a constant force to move said shutter actuation means in a direction opposite to film advance, a film engagement lever, being pivotally and slidably mounted on said shutter actuation means to engage successive perforations in a loaded film, and to move said shutter actuation means in the same direction as film advance, means urging said film engagement lever towards said loaded film, a pivotal lock lever comprising a detent end engaging and locking said ratchet, an actuation end connected to a camera external means and being moveable thereby, a main portion, which normally contacts said shutter actuation means salient portion, and contactable with said film engagement lever to move said lever out of contact with said loaded film, and a pivotable lock portion, engageable with said shutter actuation means projection portion, and means urging said lock lever to pivot to move said main portion and said lock portion thereof towards said shutter actuation means, and said detent end thereof towards said ratchet, whereby, when said ratchet is rotated, said film advance lever moves said shutter actuation means to a cocked position, and said lock lever is moved to hold said shutter actuation means in said cocked position, to lock said ratchet, and to move said film engagement lever out of engagement with said film, and, when said camera external means is actuated, said lock lever is moved to disengage said shutter actuation means, and said shutter actuation means is moved to an uncocked position, and actuates a camera shutter.

* * * * *